US012719328B2

(12) United States Patent
Yoshitome et al.

(10) Patent No.: US 12,719,328 B2
(45) Date of Patent: Aug. 25, 2026

(54) BLOWER DEVICE WITH WATER DAMAGE PREVENTION COVER

(71) Applicants: MINEBEA MITSUMI Inc., Kitasaku-gun (JP); TOYOTA JIDOSHA KABUSHIKI KAISHA, Toyota (JP)

(72) Inventors: Seiya Yoshitome, Kitasaku-gun (JP); Yoshikazu Saka, Kitasaku-gun (JP); Tomoyuki Tashiro, Kitasaku-gun (JP); Junki Sakuma, Kitasaku-gun (JP); Makoto Hidaka, Toyota (JP)

(73) Assignees: MINEBEA MITSUMI INC., Kitasaku-gun (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 18/432,654

(22) Filed: Feb. 5, 2024

(65) Prior Publication Data

US 2024/0283321 A1 Aug. 22, 2024

(30) Foreign Application Priority Data

Feb. 22, 2023 (JP) ................................ 2023-026307

(51) Int. Cl.

| | |
|---|---|
| ***H02K 5/10*** | (2006.01) |
| ***F04D 25/06*** | (2006.01) |
| ***H02K 5/22*** | (2006.01) |

(52) U.S. Cl.

CPC ............... *H02K 5/10* (2013.01); *H02K 5/225* (2013.01); *F04D 25/0693* (2013.01)

(58) Field of Classification Search

CPC . H02K 5/10; H02K 5/22; H02K 5/225; F04D 25/0693

See application file for complete search history.

(56) References Cited

U.S. PATENT DOCUMENTS

| | | | | |
|---|---|---|---|---|
| 2010/0202905 | A1* | 8/2010 | Marioni | H02K 17/30 417/423.14 |
| 2016/0305446 | A1* | 10/2016 | Motomura | F04D 29/4226 |
| 2019/0249679 | A1* | 8/2019 | Maeng | F04D 27/004 |
| 2020/0003216 | A1* | 1/2020 | Cho | A47L 15/4225 |
| 2022/0345002 | A1 | 10/2022 | Mizoe | |

FOREIGN PATENT DOCUMENTS

| | | |
|---|---|---|
| JP | 2018-062256 A | 4/2018 |
| WO | 2020/255564 A1 | 12/2020 |

* cited by examiner

*Primary Examiner* — Eric Johnson

(74) *Attorney, Agent, or Firm* — Oliff PLC

(57) ABSTRACT

A blower device includes a blower casing, an impeller accommodated inside the blower casing, a motor provided at one end side in an axial direction of the blower casing and configured to rotate the impeller, and a connector housing including a plurality of connector pins configured to supply electric power to the motor. A water damage prevention cover configured to cover an upper side of the connector housing is fixed to the connector housing.

6 Claims, 11 Drawing Sheets

BLOWER DEVICE WITH WATER DAMAGE PREVENTION COVER

CROSS-REFERENCE TO RELATED APPLICATIONS

This application claims the benefit of priority to Japanese Patent Application Number 2023-026307 filed on Feb. 22, 2023. The entire contents of the above-identified application are hereby incorporated by reference.

TECHNICAL FIELD

The present disclosure relates to a blower device and, more particularly, to a technology for applying a water damage prevention measure to an electrical component for connecting external wiring.

BACKGROUND

Blower devices using centrifugal fans are widely used for cooling, ventilation, and air conditioning in household electrical appliances, office automation equipment, and industrial equipment, vehicular equipment, and the like.

For example, in a vehicle such as a hybrid vehicle or an electric vehicle, a motor as a driving source for traveling and a battery pack for storing electric power supplied to various sensors are disposed, and a blower for cooling the battery pack is provided. In a vehicle equipped with such a battery pack, the battery pack may be disposed at a floor panel below a seat (for example, refer to JP2018-062256A).

As a blower for cooling the battery pack described in JP 2018-062256 A, a blower device being a centrifugal blower is usually used, and a blower device including a connector as an electrical component for supplying electric power to a motor is known (for example, refer to WO2020/255564).

SUMMARY

When, in a vehicle, a battery pack as described in JP2018-062256A is provided with the blower device described in WO 2020/255564 and the battery pack is disposed at a floor panel below a seat, and if a person in the vehicle spills water, drink, or the like in a container onto the seat, it may cause malfunction of a motor due to adhesion of liquid such as water from above the blower device to an electrode part of a connector being an electrical component.

The present disclosure has been made in view of the above situations, and an object of the present invention is to provide a blower device disposed below a seat of a vehicle with a water damage prevention measure against liquid such as water falling from above the blower device.

The present disclosure provides a blower device including: a blower casing; an impeller accommodated inside the blower casing; a motor provided at one end side in an axial direction of the blower casing and configured to rotate the impeller; and a connector housing including a plurality of connector pins configured to supply electric power to the motor, wherein a water damage prevention cover configured to cover an upper side of the connector housing is fixed to the connector housing.

According to the present disclosure, since water droplets falling from the seat fall onto the water damage prevention cover configured to cover the connector housing and fall from an end part of the water damage prevention cover, it is possible to avoid inconvenience such as malfunction of the motor due to the water droplets adhering to an electrode part of the connector housing.

DESCRIPTION OF EMBODIMENTS

1. Overview Configuration of Blower Device

Figure 1:
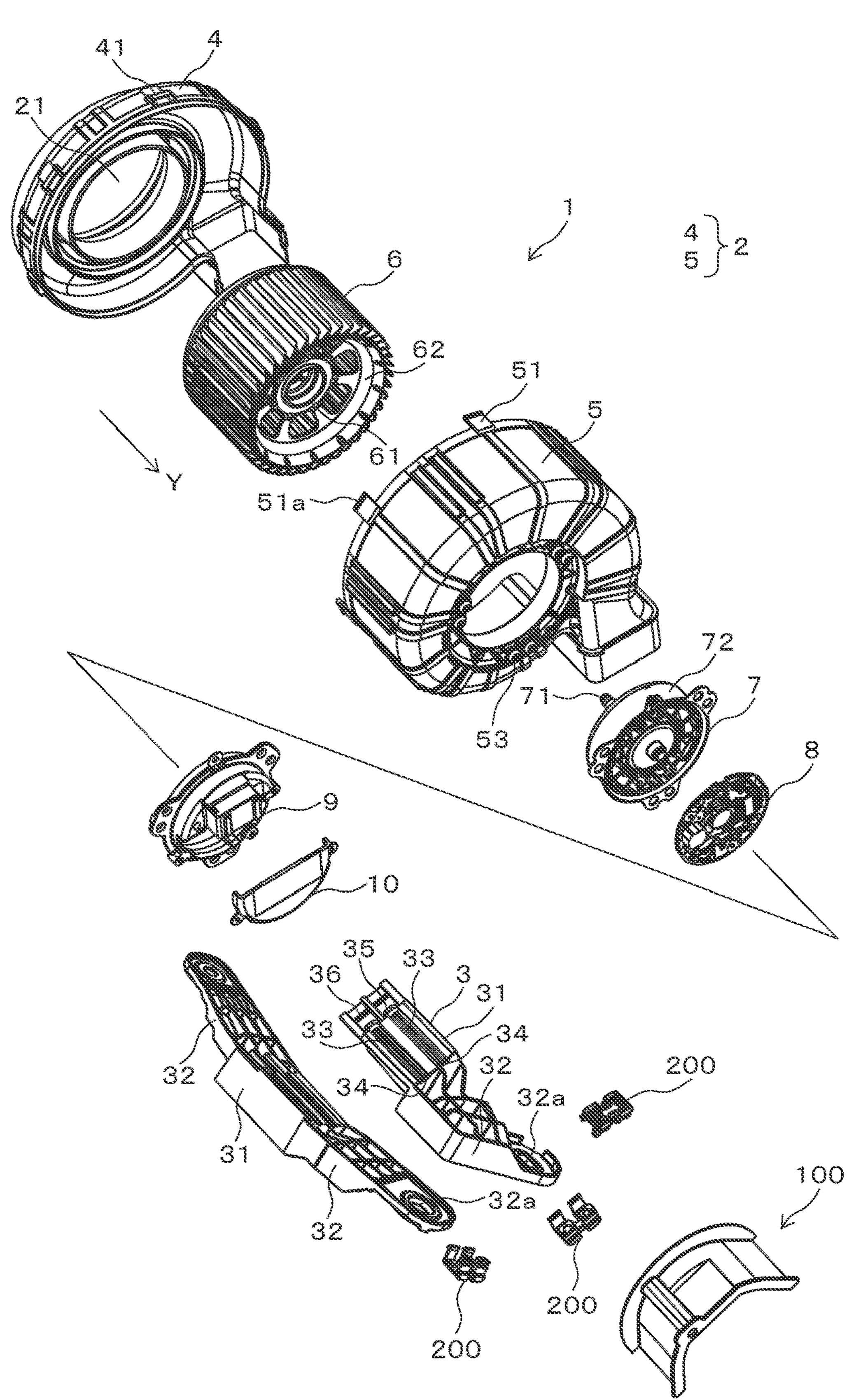
FIG. 1 is an exploded perspective view of a blower device according to an embodiment of the present disclosure.
Figure 2:
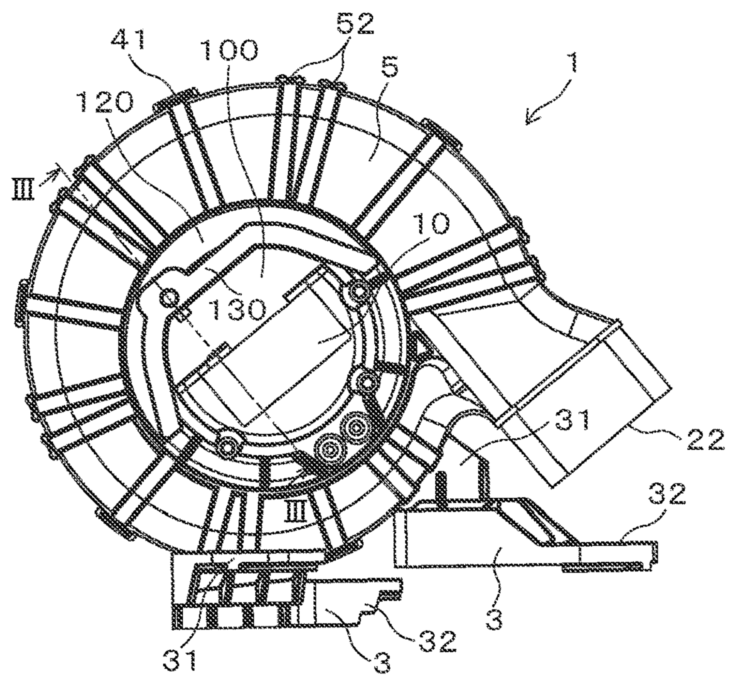
FIG. 2 is a side view of the blower device according to the embodiment.

FIG. 1 is an exploded perspective view and FIG. 2 is a side view, of a blower device 1 according to an embodiment of the present disclosure. The blower device 1 includes a blower casing 2 and a plurality of (two in this example) fixing attaching foot brackets 3. The plurality of fixing attaching foot brackets 3 are fixing members for fixing the blower casing 2 to an attachment target.

The blower casing 2 includes a blower upper casing (second blower casing) 4 and a blower lower casing (first blower casing) 5, and has a suction port 21 and an exhaust port 22. An impeller 6 provided with a plurality of blades and configured to suck and blow out air is accommodated inside the blower casing 2.

Figure 3:
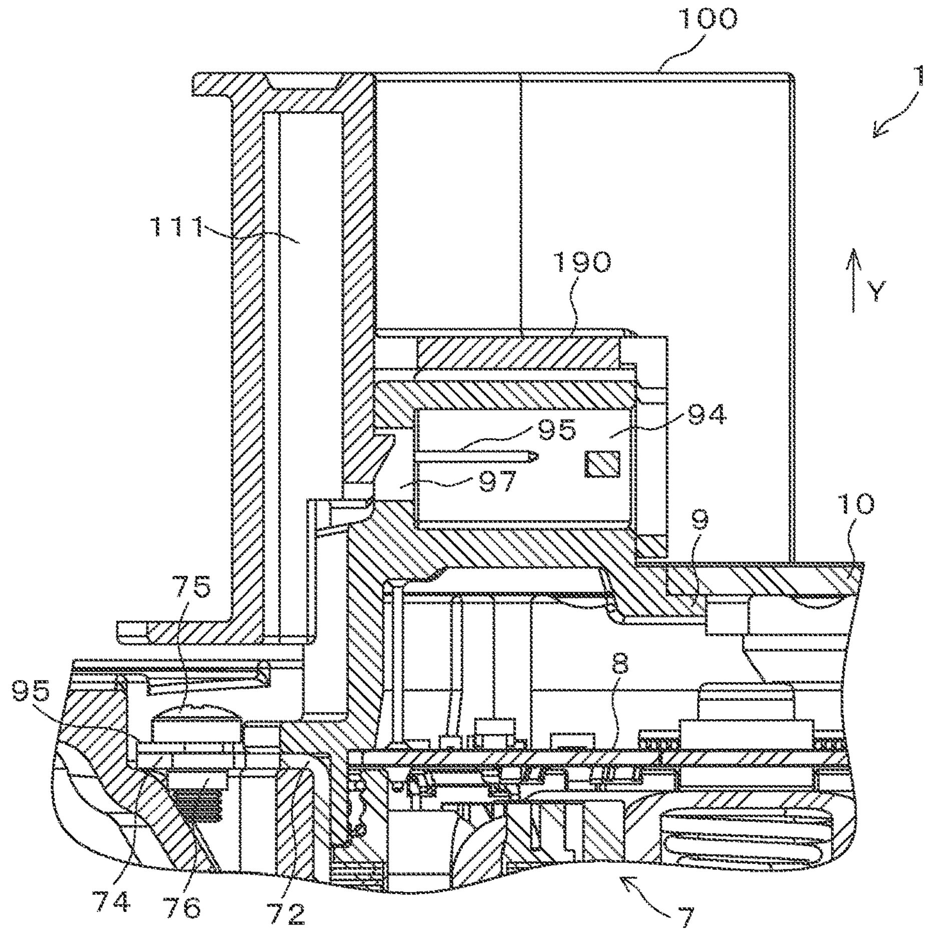
FIG. 3 is a partial enlarged view of a cross section taken along line III-III in FIG. 2.

A motor 7 being an electric motor for rotating the impeller 6 is fixed to an upper wall of the blower lower casing 5. Note that, in the following description, a direction of a shaft 71 of the motor 7 is referred to as an axial direction. In the axial direction, a direction indicated by an arrow Y in FIGS. 1 and 3 is referred to as an upper side, and a direction opposite to the upper side is referred to as a lower side. In addition, a direction orthogonal to the shaft 71 is referred to as a radial direction, and a rotation direction of the shaft 71 is referred to as a circumferential direction.

The shaft 71 of the motor 7 is a rotation shaft of the motor 7 and is a shaft connecting the impeller 6 and the motor 7. With this structure, the shaft 71 rotates the impeller 6 in accordance with rotation of the motor 7.

A circuit board 8 is disposed close to the motor 7. The circuit board 8 supplies control current to the motor 7, and drive current is supplied to the circuit board 8 from an external power supply. The circuit board 8 is fixed to an end cap 9, and the end cap 9 is fixed to a frame 72 of the motor 7. A semicircular cover 10 is fixed to the end cap 9. A connector housing 94 is integrally formed with the end cap 9 by injection molding of resin, and a water damage prevention cover 100 is attached to an outer periphery of the connector housing 94.

2. Blower Casing

As illustrated in FIG. 1, a plurality of locking pieces 51 protruding toward the blower upper casing 4 side are formed at an outer peripheral part of the blower lower casing 5, and claw parts 51*a* protruding outward in the radial direction are formed at tip ends of the locking pieces 51. On the other hand, bridge parts 41, each having a shape like a bridge, are formed at an outer peripheral part of the blower upper casing 4 at positions corresponding to the locking pieces 51. When the locking pieces 51 are inserted into the bridge parts 41 and the claw parts 51*a* pass through the bridge parts 41, the locking pieces 51 are engaged with the bridge parts 41, and the blower upper casing 4 and the blower lower casing 5 are coupled to each other.

Although not illustrated, a ridge is formed at an edge part of the blower upper casing 4, and a groove is formed at an edge part of the blower lower casing 5. When the blower upper casing 4 and the blower lower casing 5 are coupled to each other, the groove is sealed with the ridge fitting into the groove to prevent airflow leakage. One piece and the other piece of the exhaust port 22 are formed at portions of the outer peripheries of the blower upper casing 4 and the blower lower casing 5, and both pieces are combined to form the exhaust port 22.

Figure 4:
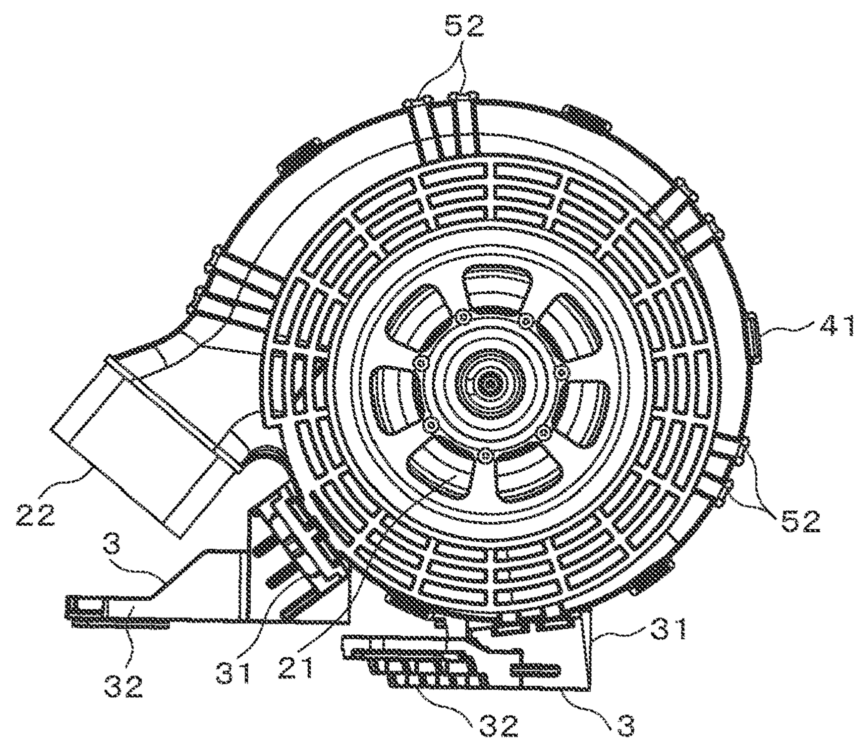
FIG. 4 is a side view viewed from an opposite direction of FIG. 2.
Figure 5:
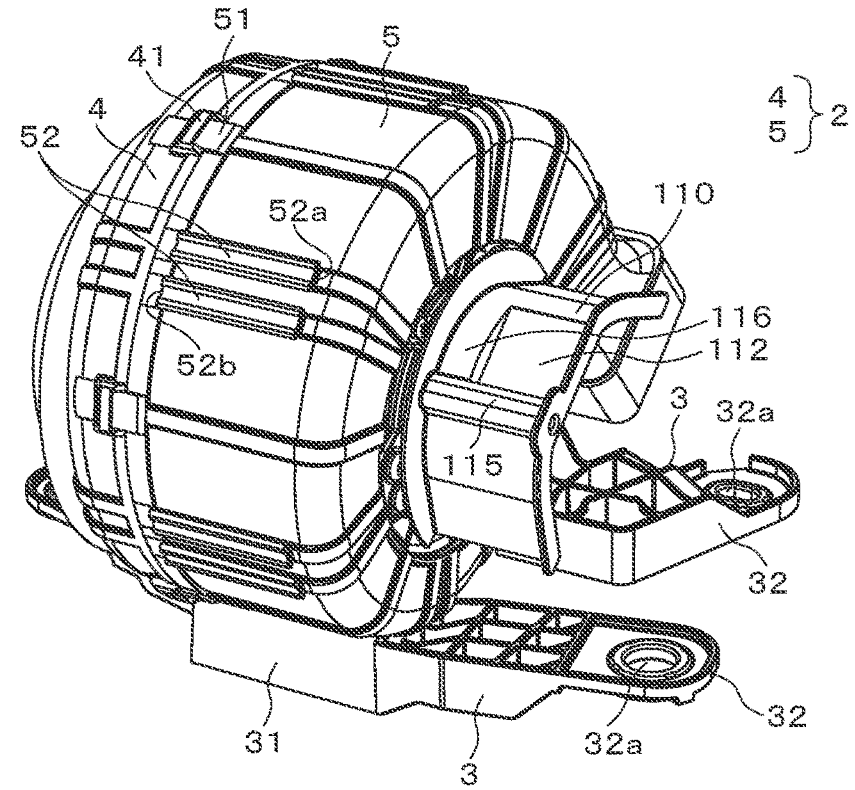
FIG. 5 is a perspective view of the blower device according to the embodiment.
Figure 6A:
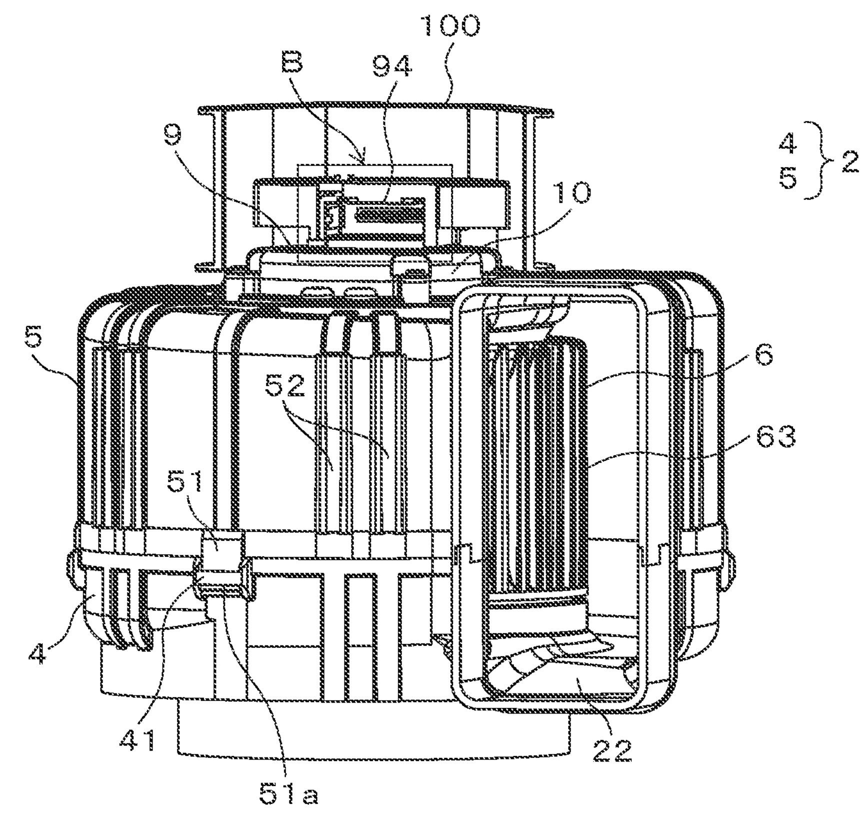
FIG. 6A is a perspective view of the blower device of the embodiment at a different viewing angle.
Figure 6B:
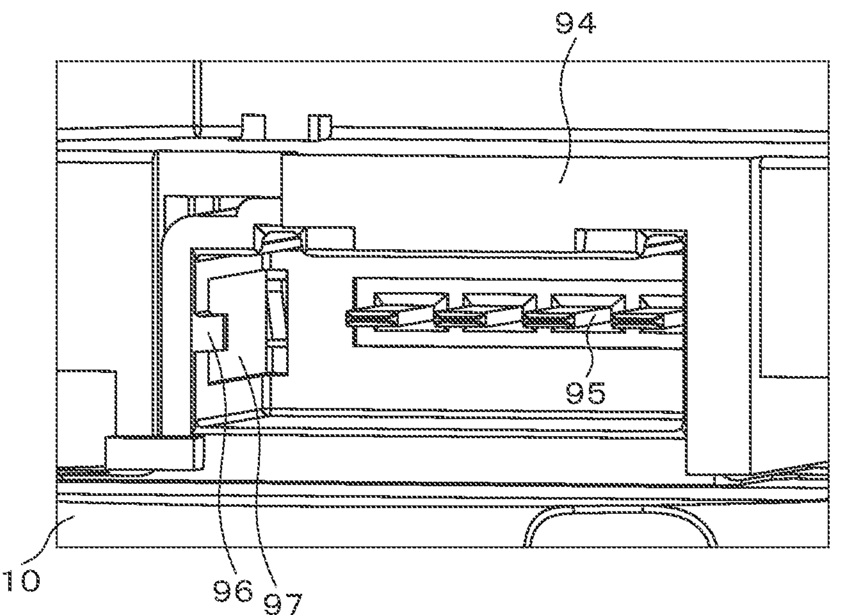
FIG. 6B is an enlarged view of a part indicated by an arrow B in FIG. 6A.
Figure 7:
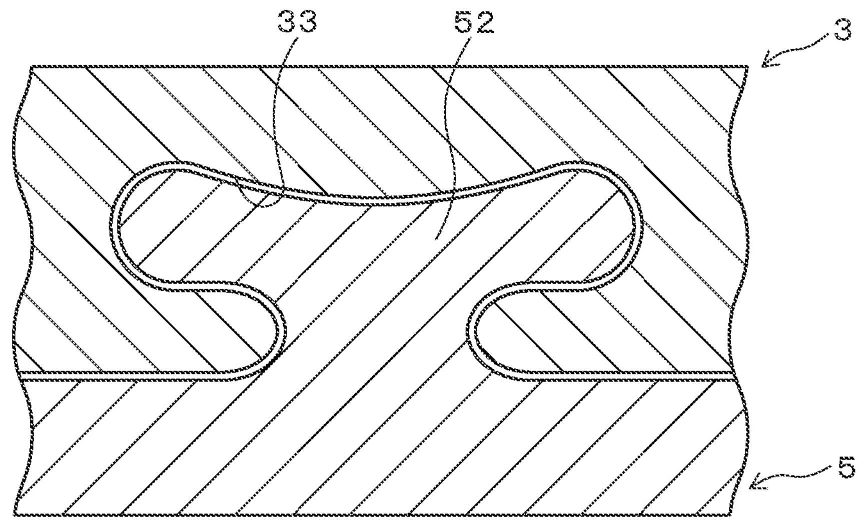
FIG. 7 is a cross-sectional view illustrating a fitted state of a projection part and a groove according to the embodiment.

As illustrated in FIGS. 4 to 6, a plurality of pairs of projection parts 52 extending in the axial direction are formed at the outer peripheral part of the blower lower casing 5 along the circumferential direction. As illustrated in FIG. 7, the projection part 52 has a substantially T-shaped cross section. The above configuration is integrally molded by injection molding of resin. In addition, as illustrated in FIG. 5, the projection part 52 has both end faces 52*a* and 52*b*. The fixing attaching foot brackets 3 are attached to the blower lower casing 5 using the projection parts 52.

3. Fixing Attaching Foot Bracket and Retaining Block

The fixing attaching foot bracket 3 includes a main body part 31 and a fixing part 32 extending from the main body part 31. The fixing part 32 is formed with a through-hole 32*a* for inserting a fastening member such as a bolt. In addition, the fixing part 32 is formed with a pair of grooves 33 (refer to FIG. 1). A cross-sectional shape of the groove 33 is substantially similar to the cross-sectional shape of the projection part 52, and as illustrated in FIG. 7, the fixing attaching foot bracket 3 is attached to the blower lower casing 5 with movement restricted in the radial direction and the circumferential direction.

As illustrated in FIG. 1, one end of the groove 33 is open and the other end is closed by a wall 34. When the projection part 52 is fitted into the groove 33 from a lower right position in FIG. 8 and slid in the axial direction, the wall 34 comes into contact with the end face 52*a* of the projection part 52 to restrict further movement of the fixing attaching foot bracket 3 in the axial direction. The movement in an opposite direction is restricted by inserting a retaining block 200, described below, into a first through-hole 35 and a second through-hole 36 formed in the fixing attaching foot bracket 3 so that the retaining block 200 comes into contact with the end face 52*b* on an opposite side of the projection part 52.

Figure 13:
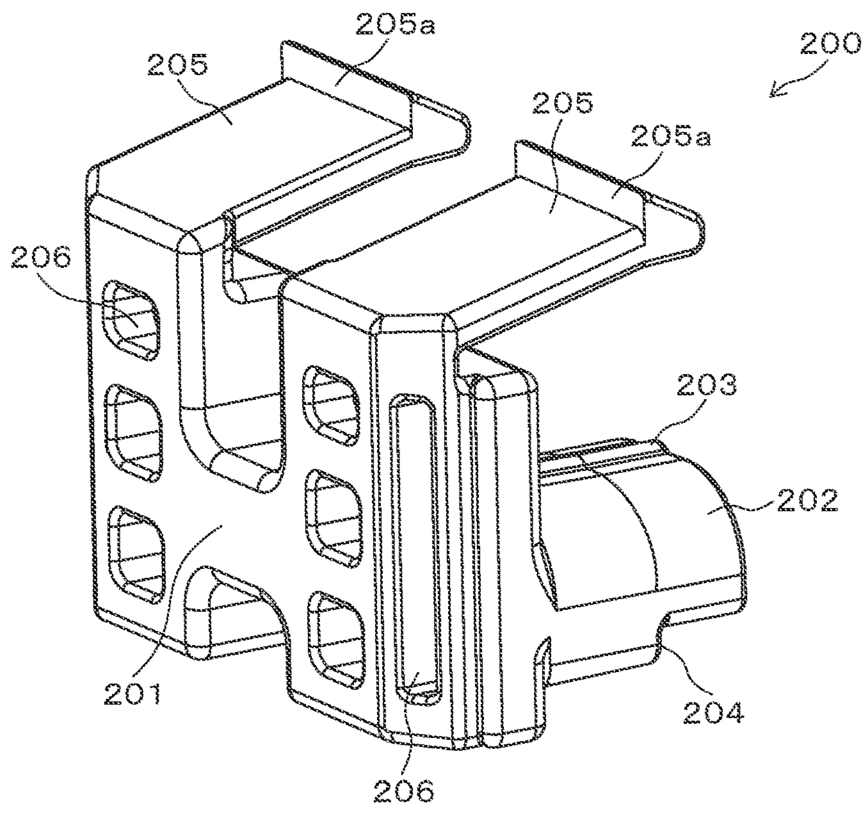
FIG. 13 is a perspective view illustrating a retaining block according to the embodiment.
Figure 14:
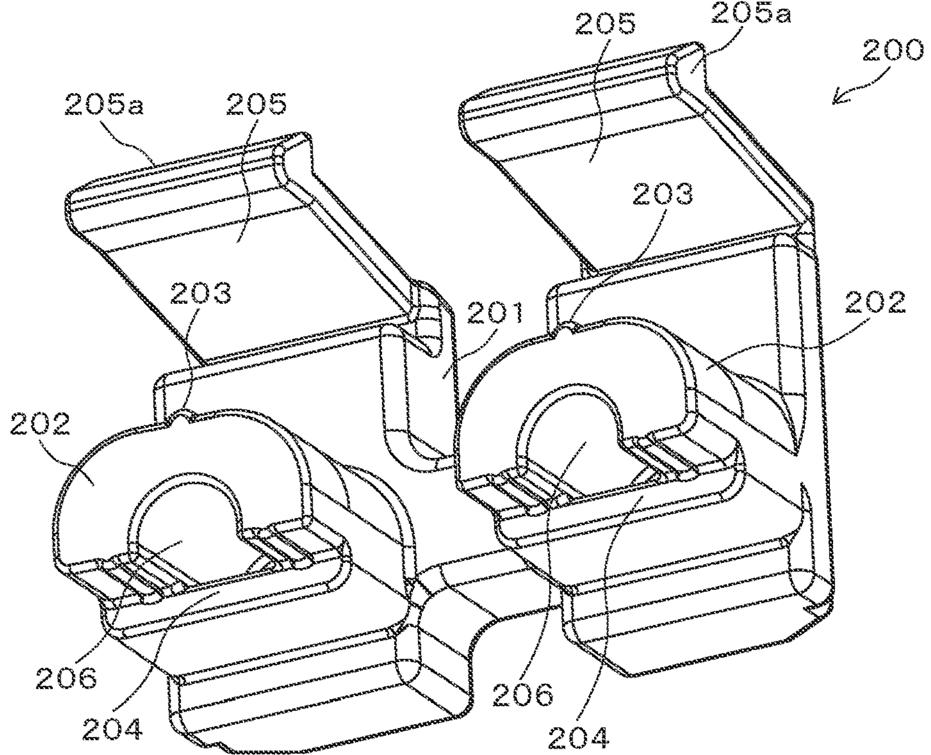
FIG. 14 is a perspective view at a different viewing angle of FIG. 13.

FIGS. 13 and 14 illustrate the retaining block 200. The retaining block 200 is integrally molded by injection molding of resin and includes a main body part 201 having an H shape in side view. At both sides of one end part of the main body part 201, retaining leg parts 202 protruding in the thickness direction of the main body part 201 is formed. The retaining leg part 202 has a substantially semicircular cross section, and formed with a ridge 203 at a top surface of the substantially semicircular cross section. In addition, a step part 204 is formed at an opposite side of the retaining leg part 202 from the ridge 203. The other end part of the main body part 201 is provided with locking leg parts 205 inclined so as to be spaced apart from the retaining leg parts 202 toward the thickness direction of the main body part 201.

A claw part 205*a* is formed at a tip end part of the locking leg part 205. Note that a reference numeral 206 in the drawing denotes a concave part, and a concave part 206 serves as a measure against a sink mark at the time of resin molding of the retaining block 200 and is also intended to reduce a weight of the retaining block 200.

The retaining leg part 202 and the locking leg part 205 of the retaining block 200 are respectively inserted into the first and second through-holes 35 and 36 formed in the main body part 31 of the fixing attaching foot bracket 3. At the time of insertion, the ridge 203 formed at the retaining leg part 202 comes into contact with the first through-hole 35, and the other part of the top surface of the retaining leg part 202 does not come into contact with the first through-hole 35. As a result, resistance at the time of insertion is small, and insertion is performed without backlash.

At this time, the claw part 205*a* is pressed by an edge part of the second through-hole 36, and the locking leg part 205 is elastically deformed. Then, the step part 204 of the retaining block 200 comes into contact with the main body part 31, and at the same time, the claw part 205*a* comes out of the second through-hole 36, and the locking leg part 205 is elastically restored, so that the claw part 205*a* is engaged with an edge part of the second through-hole 36 and the retaining leg part 202 comes into contact with the other end face 52*b*, in the axial direction, of the projection part 52. As a result, the fixing attaching foot bracket 3 cannot be moved in any direction of the axial direction.

4. Motor and Impeller

Figure 9:
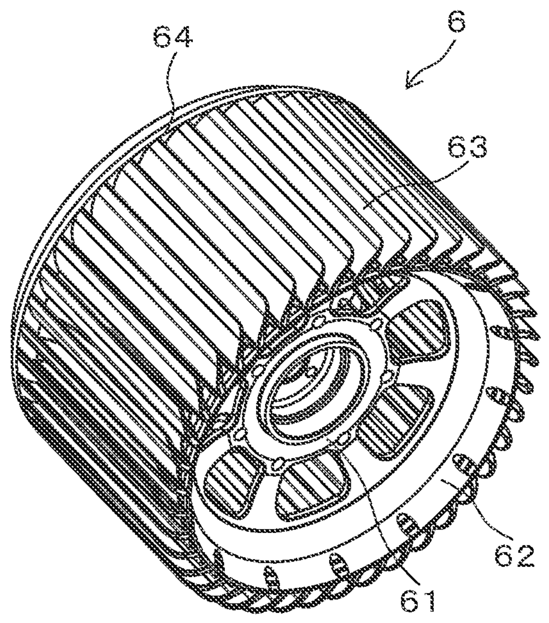
FIG. 9 is a perspective view illustrating an impeller according to the embodiment.

As illustrated in FIG. 9, the impeller 6 includes a hub 61 at a central part, a substantially disc-shaped flange 62 formed at an outer peripheral part of the hub 61, a plurality of blades 63 erected at an outer peripheral surface of the flange 62, and a coupling ring 64 coupling the plurality of blades 63. When the motor 7 is driven, the shaft 71 rotates, and the impeller 6 rotates with the rotation of the shaft 71. By the rotation of the impeller 6, the air sucked from the suction port 21 is guided to the inside of the impeller 6, is discharged into the blower casing 2 from between the plurality of blades 63, passes through a flow path in the blower casing 2, and is blown out to the outside of the blower casing 2 from the exhaust port 22.

Figure 8:
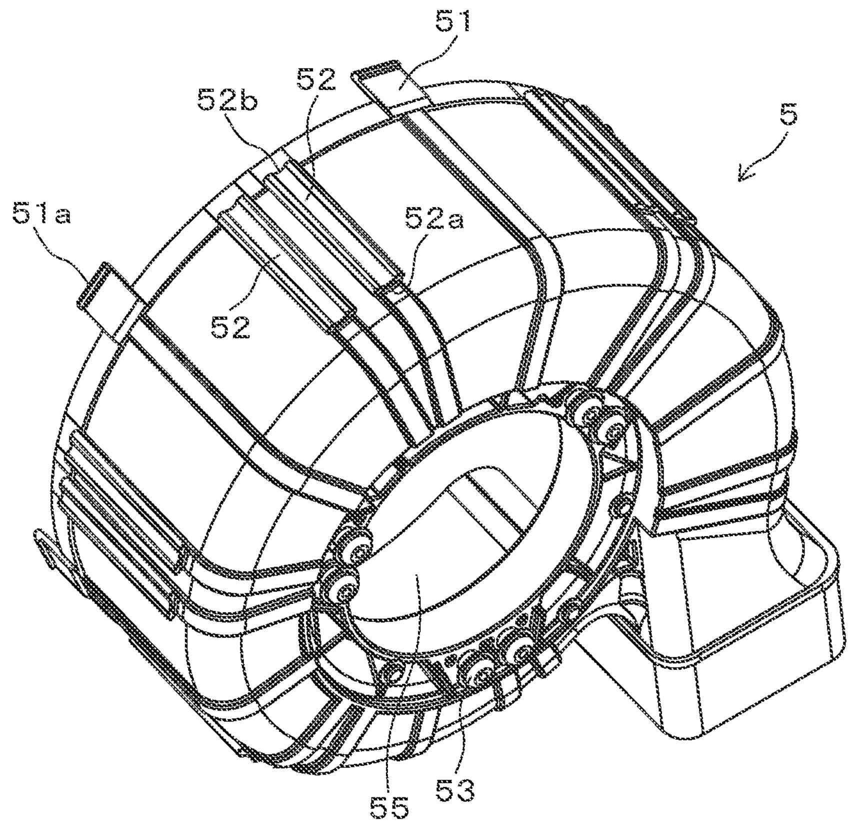
FIG. 8 is a perspective view illustrating a blower lower casing according to the embodiment.
Figure 10:
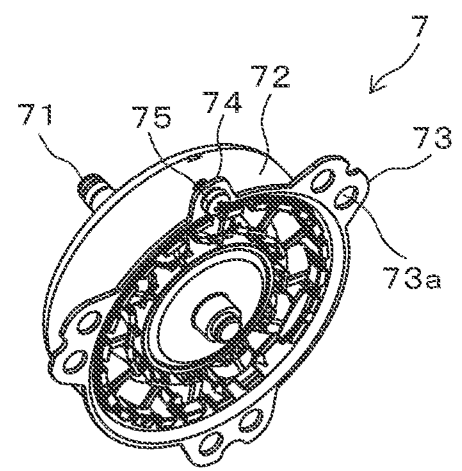
FIG. 10 is a perspective view illustrating a motor according to the embodiment.

As illustrated in FIG. 10, the frame 72 of the motor 7 is formed with a plurality of (three in this example) flanges 73 protruding outward in the radial direction, and the flanges 73 are formed with two through-holes 73*a*. On the other hand, as illustrated in FIG. 8, a circular opening part 55 is formed at a central part of the blower lower casing 5, and columnar projections 53 protruding in the axial direction are formed around the opening part 55. Note that the projection 53 illustrated in FIG. 8 is in a state of being crushed by thermal caulking. By inserting the projections 53 into the through-holes 73*a*, the frame 72 is fixed to the blower upper casing 4 together with the end cap 9. The fixing method will be described below.

A flange 74 is further formed at an intermediate part between the flange 73 and the flange 73. As illustrated in FIG. 3, a screw 75 is inserted into a through-hole formed at the flange 74, and an end part of one connector pin 95 is sandwiched by a head part of the screw 75 and the flange 74 and is fastened and fixed by a nut 76. The connector pin 95 is grounded by being brought into contact with the frame 72 made of a conductive material (for example, metal), and a GND pattern of the circuit board 8 connected to the other end part of the connector pin 95 is set to a reference potential (for example, 0 volt).

5. End Cap and Cover

Figure 11:
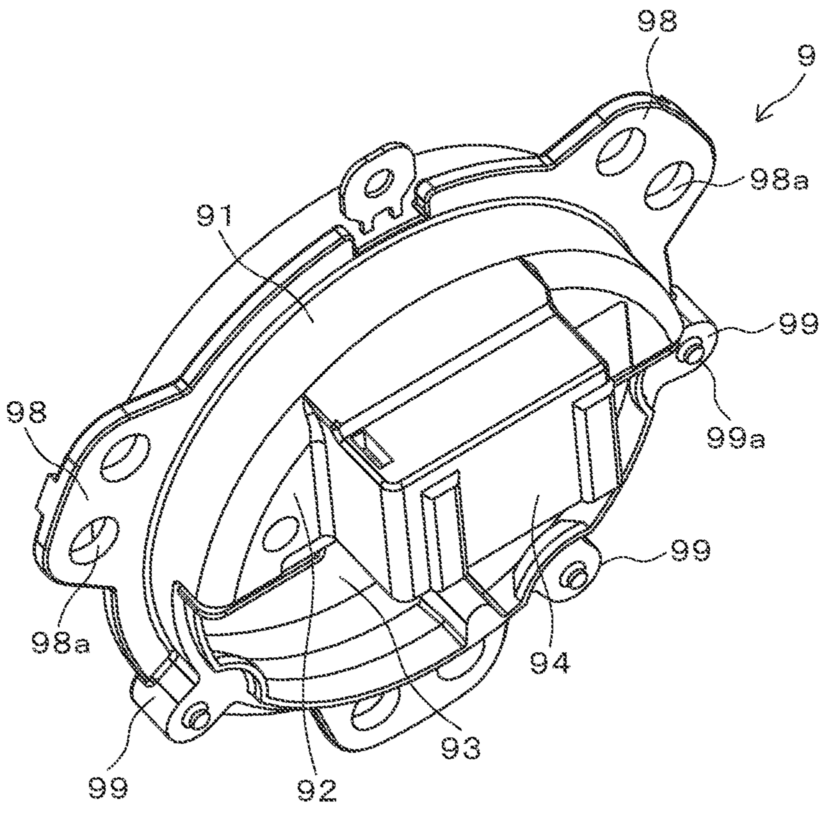
FIG. 11 is a perspective view illustrating an end cap according to the embodiment.

FIG. 11 illustrates the end cap 9. The end cap 9 has a substantially disc shape including a cylindrical part 91, a semicircular top plate part 92, and a semicircular opening part 93, and the cylindrical part 91 is fitted in the opening part 55 of the blower lower casing 5. The connector housing 94 is integrally formed with the top plate part 92 of the end cap 9 by injection molding of resin. The connector housing 94 is molded using the plurality of connector pins 95 (refer to FIG. 6B) as an insert material, the connector pins 95 are L-shaped, and one end part of each of the connector pins protrudes into the connector housing 94, and the other end parts extend in the axial direction and are electrically connected to a wiring pattern of the circuit board 8.

A connector plug (not illustrated) connected to an external power supply is inserted into the connector housing 94, and the external power supply is supplied to the circuit board 8. As illustrated in FIG. 6B, a projection 96 protruding inward is formed at an inner peripheral surface of the connector housing 94. The projection 96 is engaged with a concave part formed at the connector plug to form a retainer. The connector housing 94 is formed with a hole 97 (through-hole) for extracting a die for forming the projection 96.

The end cap 9 includes a plurality of (three in this example) flanges 98 extending outward in the radial direction from the cylindrical part 91. The flanges 98 are formed with two through-holes 98*a*. The motor 7 and the end cap 9 are fixed to the blower lower casing 5 by inserting the projections 53, formed at the blower lower casing 5, into the through-holes 98*a* and the through-holes 73*a* formed at the flanges 73 of the frame 72 of the motor 7, and thermally caulking and crushing the projections 53.

A plurality of (three in this example) convex parts 99 protruding outward in the radial direction are formed at an outer peripheral part on an opposite side of the end cap 9 from the top plate part 92, and projections 99*a* protruding in the axial direction are formed at the convex parts 99. The cover 10 is fixed using the projections 99*a*.

Figure 12:
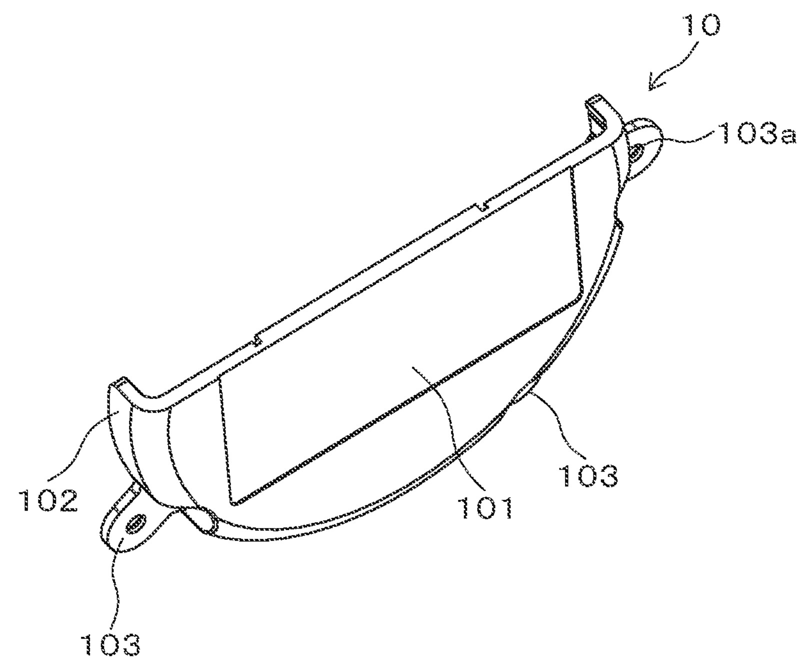
FIG. 12 is a perspective view illustrating a cover according to the embodiment.

As illustrated in FIG. 12, the cover 10 is made of a semicircular insulating resin and closes the opening part 93 on an opposite side of the end cap 9 from the top plate part 92 to protect the circuit board 8 provided with electronic circuits, electronic components and the like for driving and controlling the motor 7 and formed with a wiring pattern. The cover 10 includes a semicircular top plate part 101 and a cylindrical part 102 extending in the axial direction from an outer peripheral edge part of the top plate part 101. A flange 103 protruding outward in the radial direction is formed on the cylindrical part 102, and a through-hole 103*a* is formed at the flange 103. The cover 10 is fixed to the end cap 9 by inserting the projection 99*a* of the end cap 9 into the through-hole 103*a* and crushing the projection 99*a* by thermal caulking.

6. Water Damage Prevention Cover

Figure 15:
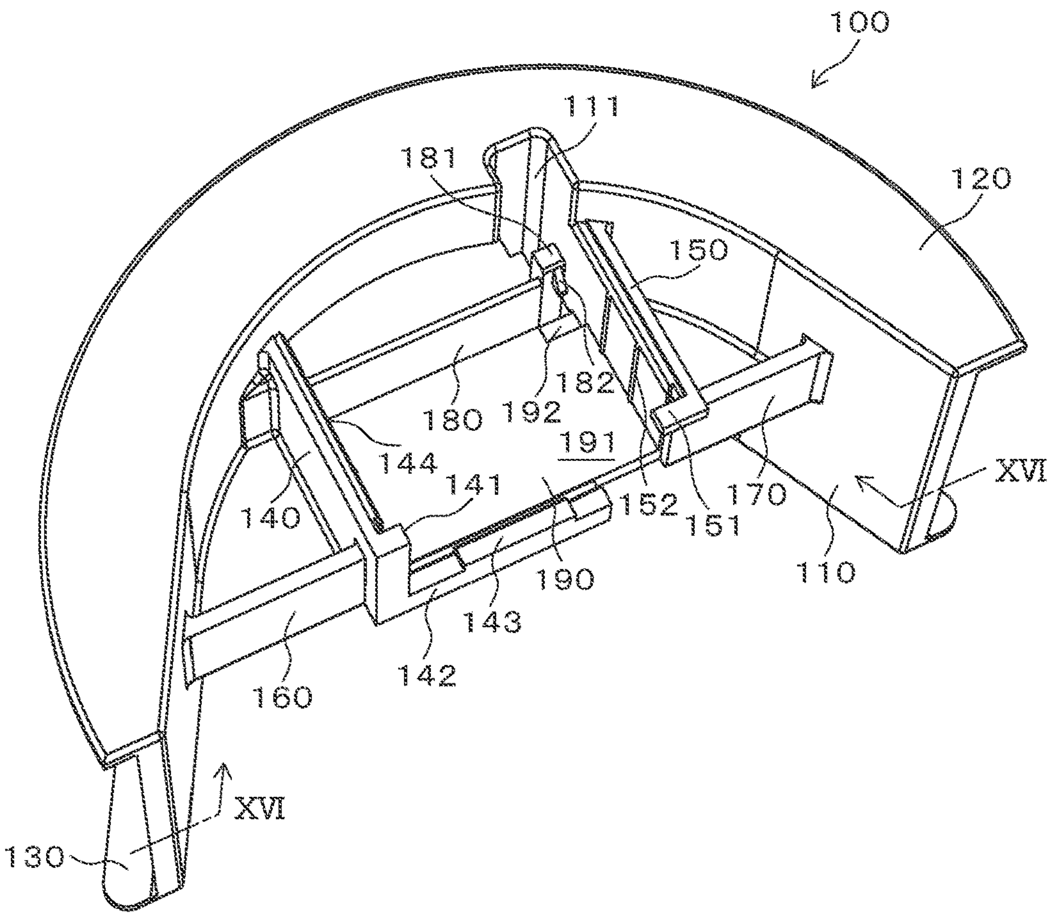
FIG. 15 is a perspective view illustrating a water damage prevention cover according to the embodiment.
Figure 16:
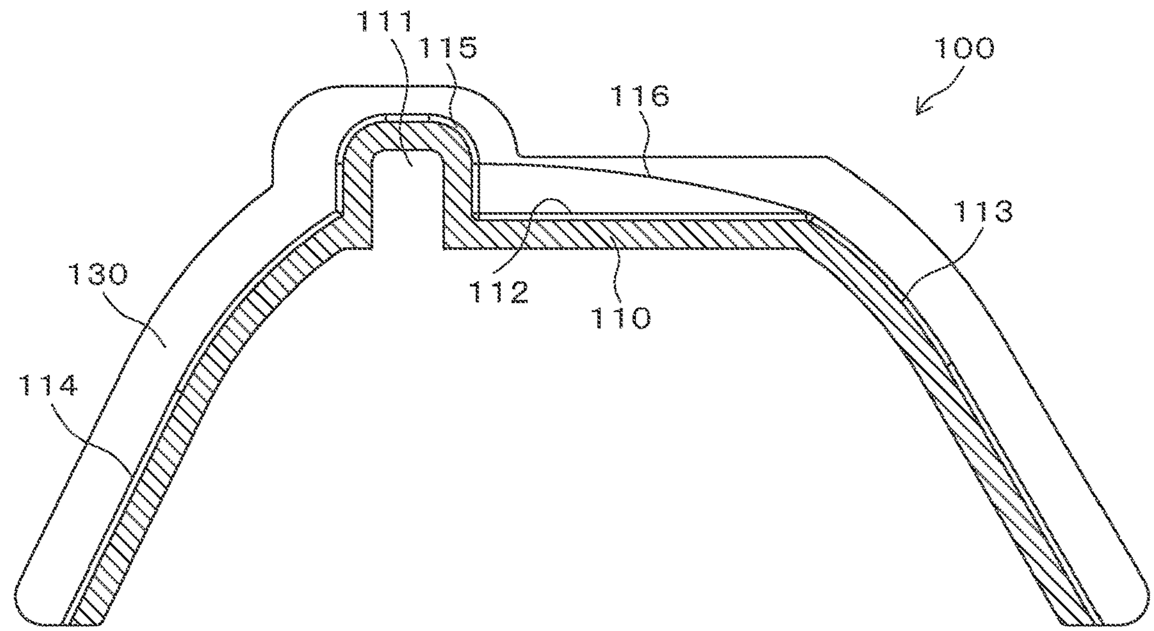
FIG. 16 is a cross-sectional view taken along line VI-VI in FIG. 15.

FIGS. 15 to 19 illustrate the water damage prevention cover 100. The water damage prevention cover 100 includes a water damage prevention cover part 110 having a substantially trapezoidal cross section, and a first flange part 120 and a second flange part 130 narrower than the first flange part 120 are formed at both end parts, in the axial direction, of the water damage prevention cover part 110. The first flange part 120 has a substantially semicircular shape. As illustrated in FIG. 16, the water damage prevention cover part 110 includes a horizontal plate part 112 at a central part and inclined plate parts 113 and 114 extending from both end parts of the horizontal plate part 112 while being inclined in an inverted V-shape. A convex part 115 is formed at one end part of the horizontal plate part 112, and a concave part 111 extending in the axial direction is formed at the convex part 115. An arc-shaped plate part 116 is formed adjacent to the horizontal plate part 112 in the axial direction between the convex part 115 and the end part of the horizontal plate part 112. The second flange part 130 has a shape conforming to the water damage prevention cover part 110.

As illustrated in FIG. 15, a first plate part 140 and a second plate part 150 extending in a direction of a straight line connecting end parts of the water damage prevention cover part 110 are formed at locations near a center in the circumferential direction of an inner peripheral surface of the water damage prevention cover part 110. A first arm part 160 is bridged between a tip end part of the first plate part 140 and the inner peripheral surface of the water damage prevention cover part 110, and a second arm part 170 is bridged between a tip end part of the second plate part 150 and the inner peripheral surface of the water damage prevention cover part 110. Further, a third plate part 180 extending to a position before the second plate part 150 is formed at a base part of the first plate part 140.

A top plate part 190 is formed at the inner peripheral surface of the water damage prevention cover part 110 so as to extend from the inner peripheral surface to the first and second arm parts 160 and 170. The top plate part 190, the first and second plate parts 140 and 150, and the third plate part 180 form an accommodating part 191 closed on an upper side in the axial direction and in three directions orthogonal to the axial direction.

A locking piece 181 having a rectangular cross section and extending in the axial direction is formed at one end part of the third plate part 180. A locking claw 182 is formed at a side surface of an end part of the locking piece 181. An extraction hole (through-hole) 192 is formed adjacent to the locking piece 181. The extraction hole 192 is formed by a part of a molding die for molding the locking claw 182. In addition, a concave part 111 is formed on the water damage prevention cover part 110 side of the locking piece 181. The concave part 111 is formed by a part of a molding die for molding the locking piece 181.

A first restricting part 141 protruding toward the second plate part 150 side and extending in the axial direction is formed at an end part of the first plate part 140. A third arm part 142 extending toward the second plate part 150 side is formed at an end part, in the axial direction, of the first restricting part 141, and a second restricting part 143 protruding in the axial direction and extending in the radial direction is formed at a substantially central part of the third arm part 142. A third restricting part 151 protruding toward the first plate part 140 side is formed at an end part of the second plate part 150 on the second arm part 170 side.

A width of the water damage prevention cover part 110 (a dimension in the left-right direction in FIG. 6A) is set to be greater than a width of the connector housing 94, and a height of the water damage prevention cover part 110 (a dimension in the up-down direction in FIG. 6A) is set to be greater than a height of the connector housing 94.

A plurality of (two in this example) ridges 144 extending in the axial direction are formed at a surface of the first plate part 140, facing the second plate part 150 side. In addition, a plurality of (two in this example) ridges 152 extending in the axial direction are formed at a surface of the second plate part 150, facing the first plate part 140 side.

7. Assembling Method

Figure 17:
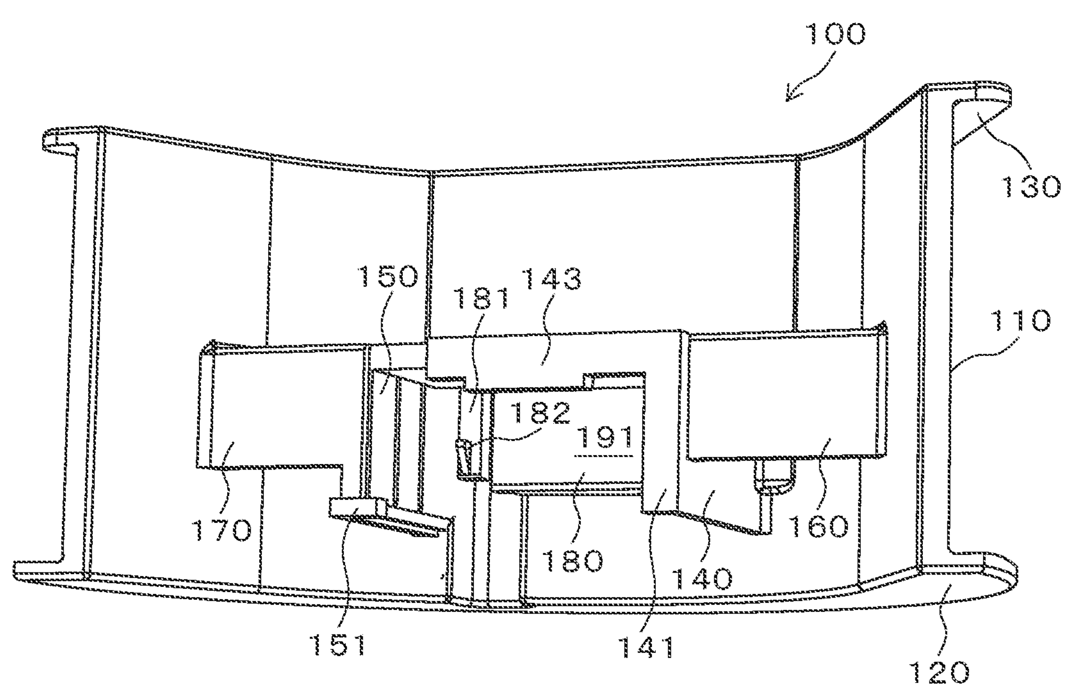
FIG. 17 is a perspective view of the water damage prevention cover illustrated in FIG. 15, viewed from an opposite side.
Figure 18:
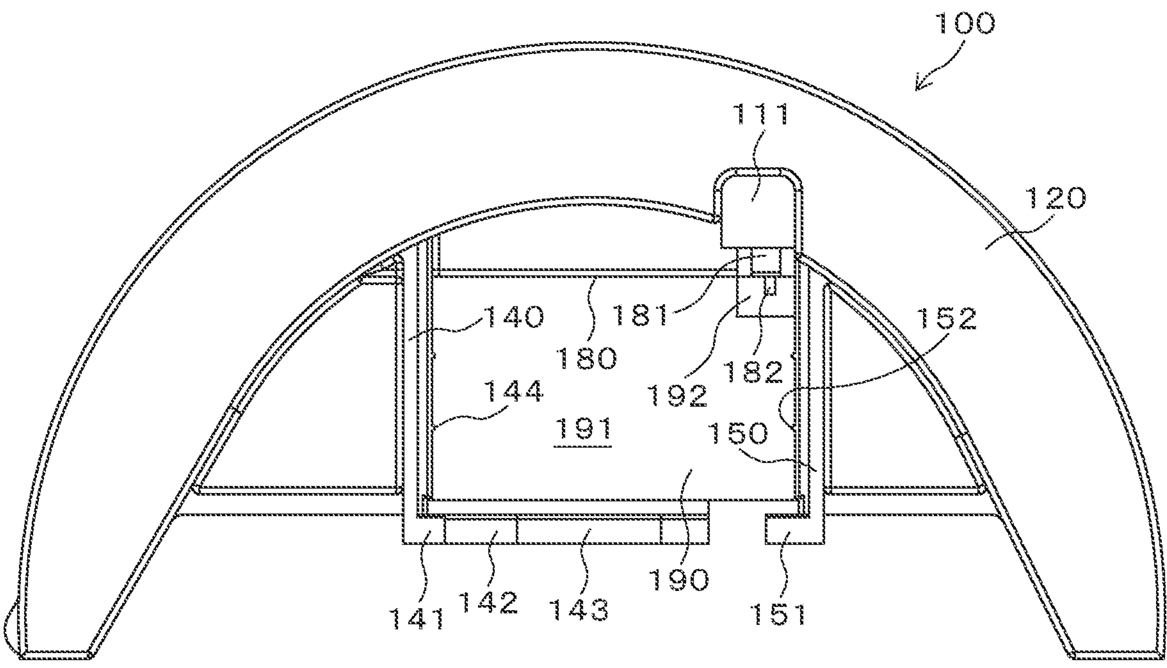
FIG. 18 is a plan view of the water damage prevention cover.
Figure 19:
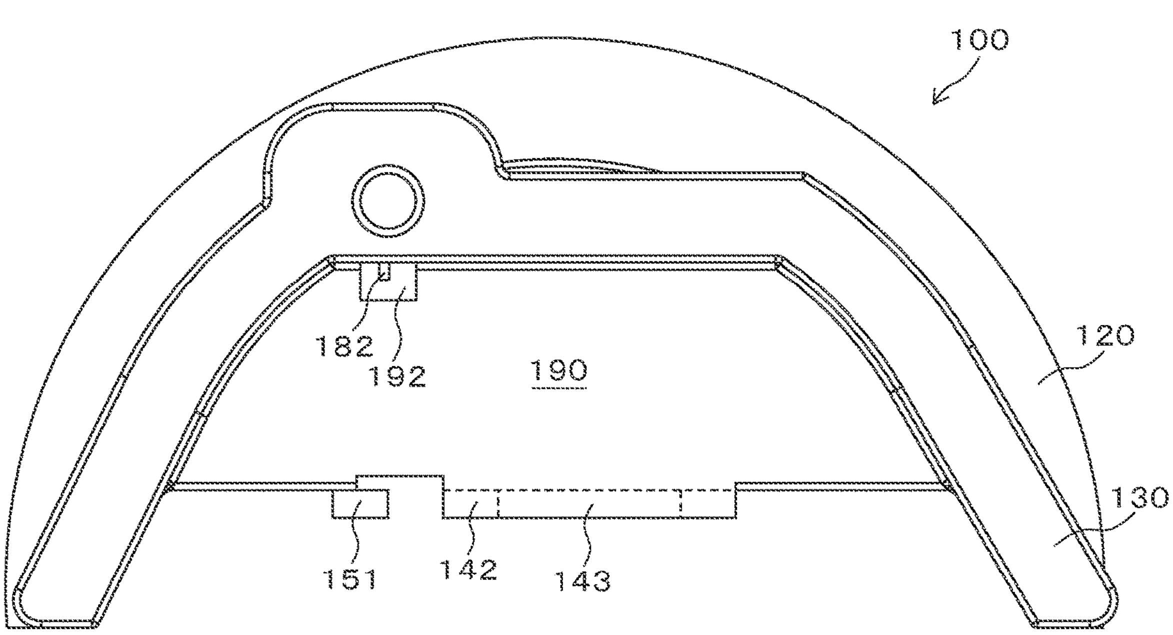
FIG. 19 is a rear view of the water damage prevention cover.

A method of attaching the water damage prevention cover 100 to the blower casing 2 will be described. As illustrated in FIG. 17, one surface of the accommodating part 191 is open. A position of the opened surface is aligned with the opening part of the connector housing 94, and the water damage prevention cover 100 is moved in the axial direction so that the connector housing 94 is accommodated in the accommodating part 191. Then, the locking claw 182 is engaged with the extraction hole 97 of the connector housing 94. At the same time, the top plate part 190 of the water damage prevention cover 100 comes into contact with the connector housing 94 and stands still. In this state, the movement of the water damage prevention cover 100 in any direction of the axial direction is restricted.

8. Operation and Effects

As illustrated in FIG. 2, in the water damage prevention cover 100 being mounted to the connector housing 94, the water damage prevention cover 100 is inclined, but the connector housing 94 is entirely covered with the water damage prevention cover 100, except for the opening part of the connector housing. Thus, water droplets flowing down from the seat fall onto the water damage prevention cover part 110 and flow down from both end parts of the water damage prevention cover part 110 onto the floor, so that the water droplets do not fall onto the connector housing 94. Thus, it is possible to avoid such inconvenience such as malfunction of a motor due to the water droplets adhering to the connector pins 95 of the connector housing 94.

In particular, in the above-described embodiment, since the width of the water damage prevention cover part 110 is set to be greater than the width of the connector housing 94, and the height of the water damage prevention cover part 110 is set to be greater than the height of the connector housing 94, the above-described operation and effect can be reliably obtained.

Further, in the above-described embodiment, since the second flange part 130 is provided at the end part of the water damage prevention cover part 110, the water droplets falling and splashing on the water damage prevention cover part 110 are received by the second flange part 130. Thus, it is possible to suppress the splash of water droplets from entering the connector housing 94.

In the above-described embodiment, the water damage prevention cover 100 includes the accommodating part 191 for accommodating the connector housing 94, the accommodating part 191 is provided with the locking piece 181, and the locking piece 181 is formed with the locking claw 182 protruding inward. Since the locking claw 182 is engaged with the extraction hole 97 provided at the wall part of the connector housing 94, the water damage prevention cover 100 can be easily mounted to the connector housing 94.

In addition, since the accommodating part 191 includes the first plate part 140, the second plate part 150, and the third plate part 180 that surround the surfaces of the connector housing 94, except for the opening part, and the first plate part 140 and the second plate part 150 are formed with the ridges 144 and 152 extending in the axial direction, resistance at the time of mounting the accommodating part 191 to the connector housing 94 is small.

Further, since the opening part of the accommodating part 191 is provided with the first restricting part 141, the second restricting part 143, and the third restricting part 151, the connector housing 94 does not protrude from the opening part of the water damage prevention cover 100.

9. Modification Examples

The present disclosure is not limited to the embodiment described above, and it is possible to make various modifications as described below.

In the above-described embodiment, the locking claw 182 is engaged with the extraction hole 97 formed at the connector housing 94, but a through-hole formed at another position may be used without using the extraction hole 97.

The motor 7, the end cap 9, and the water damage prevention cover 100 may be fixed to the blower lower casing 5 by forming a through-hole at the first flange part 120 of the water damage prevention cover 100, aligning the through-hole with the through-hole 98*a* of the flange 98 of the end cap 9 and the through-hole 73*a* formed at the flange 73 of the frame 72 of the motor 7, inserting the projection 53 formed at the blower lower casing 5 into the through-holes, and thermally caulking and crushing the projection 53.

Although the end cap 9 is provided with the connector housing 94 in the above-described embodiment, the motor 7 may be provided with the connector housing. In this case, the water damage prevention cover 100 may be fixed to the blower lower casing 5 together with the motor 7 by a fixing member (for example, a screw, a bolt, thermal caulking by a resin projection, or the like) for fixing the motor 7 to the blower lower casing 5.

INDUSTRIAL APPLICABILITY

The present disclosure is applicable to a blower device used for air blowing, ventilation, cooling, and the like in household electrical appliances, office automation equipment, and industrial and vehicular equipment.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A blower device comprising:

a blower casing;

an impeller accommodated inside the blower casing;

a motor provided at one end side in an axial direction of the blower casing and configured to rotate the impeller; and a connector housing comprising a plurality of connector pins configured to supply electric power to the motor, wherein;

a water damage prevention cover configured to cover an upper side of the connector housing is fixed to the connector housing, the water damage prevention cover includes a water damage prevention cover part having a substantially trapezoidal cross section, and a first flange part and a second flange part are formed at both end parts, in the axial direction, of the water damage prevention cover part.

2. The blower device according to claim 1, wherein the water damage prevention cover comprises an accommodating part configured to accommodate the connector housing, the accommodating part is provided with a locking claw protruding inward, and the locking claw is engaged with a through-hole provided at a wall part of the connector housing.

3. The blower device according to claim 2, wherein the accommodating part comprises a plurality of wall surfaces surrounding surfaces, except for an opening part, of the connector housing, and at least one of the wall surfaces is provided with a ridge extending in the axial direction.

4. The blower device according to claim 2, wherein the accommodating part comprises an opening part facing in the same direction as an opening of the connector housing, and an edge part of the opening part is provided with a restricting part protruding inside the opening part to restrict relative movement of the connector housing toward an opening side of the opening part.

5. The blower device according to claim 1, wherein the water damage prevention cover part includes a horizontal plate and inclined plates extending from both ends of the horizontal plate so that the inclined parts are inclined in an inverted V-shape from the both ends of the horizontal plate.

6. The blower device according to claim 1, wherein the first flange has a semicircular shape, and the second flange has a semicircular shape narrower than the first flange.

* * * * *